Oct. 10, 1950　　　　　E. D. SMITH　　　　2,524,844
EGG OPENING MEANS

Filed Oct. 22, 1947　　　　　　　　　　7 Sheets-Sheet 1

Fig. 1

INVENTOR
EARL D. SMITH
BY Weatherford and
Weatherford attys

Oct. 10, 1950    E. D. SMITH    2,524,844
EGG OPENING MEANS
Filed Oct. 22, 1947    7 Sheets-Sheet 3

INVENTOR
EARL D. SMITH
BY Weatherford and
Weatherford Attys

Oct. 10, 1950     E. D. SMITH     2,524,844
EGG OPENING MEANS Filed Oct. 22, 1947     7 Sheets-Sheet 4

INVENTOR
EARL D. SMITH
BY Weatherford and
Weatherford attys

Oct. 10, 1950     E. D. SMITH     2,524,844
EGG OPENING MEANS Filed Oct. 22, 1947     7 Sheets-Sheet 5

INVENTOR
EARL D. SMITH
BY Weatherford and
Weatherford attys

Oct. 10, 1950 E. D. SMITH 2,524,844
EGG OPENING MEANS
Filed Oct. 22, 1947 7 Sheets-Sheet 6

INVENTOR
EARL D. SMITH
BY Weatherford and
Weatherford attys

Patented Oct. 10, 1950

2,524,844

UNITED STATES PATENT OFFICE 2,524,844

EGG OPENING MEANS

Earl D. Smith, Memphis, Tenn.

Application October 22, 1947, Serial No. 781,324

26 Claims. (Cl. 146—2)

This invention relates to new and useful improvements in egg handling apparatus, and particularly relates to a new and improved apparatus for capping eggs and removing the liquid egg material therefrom.

It is desirable to remove or mix the liquid egg material from egg shells and to treat such mixture by further processing, either bp freezing or by drying. Many efforts have been directed toward mechanically removing the liquid contents from egg shells which have proven ineffectual because of the extensive period of time required for the completion of the preparation of the eggs by such means.

It is well recognized that because of the absorbent nature of eggs, speed and sanitation in the operation is essential to minimize any possible increase of the bacteria content of the eggs due to exposure to unsterile air.

The present invention is designed to reduce the time of operation to the shortest possible period and to clean and cap eggs and remove the liquid content from the shells and deliver this liquid content to a processing vat in a matter of a very few minutes.

The principal object of the invention is to provide mechanical means for removing the whole content of eggs from the shells and to deliver the removed contents to a processing vat as rapidly as possible.

A further object of the invention is to provide means for capping eggs and insuring the discharge and removal of the full content from each egg shell and for segregating the shells from the liquid egg material taken therefrom.

A further object of the invention is to provide a machine by which continuous egg handling may be accomplished, including endless conveyor means for initially receiving the eggs and transporting them through the processing steps to discharge of the liquid contents and including means for the subsequent discharge of the emptied shells.

A further object of the invention is to provide a new and novel conveyor means by which the eggs are thus transported.

A further object of the invention is to provide egg handling machines which includes saw means for removing caps from the egg shells and means for insuring uniform positioning of the eggs relative to the saw.

A further object of the invention is to provide an egg handling machine which includes means for removing caps from eggs and means for piercing the membranes of the capped eggs, which latter means are synchronized with the operation of the said machine.

A further object of the invention is to provide an egg handling machine which caps the eggs handled thereby and includes means for piercing the shell of the eggs substantially opposite the capped end and to insure gravity discharge of the contents of such shells.

The means by which the foregoing and other objects are accomplished and the manner of their accomplishment will readily be understood from the following specification upon reference to the accompanying drawings, in which.

Referring now to the drawings in which the various parts are indicated by numerals:

The machine is shown as mounted on a supporting frame consisting of longitudinal upper members 11, a rear cross member 13, front and rear legs 15, 17, and intermediate longitudinal members 19. Mounted on and secured to the upper longitudinal members are bearings 21 disposed in transversely arranged pairs. In the forward pair of bearings is journalled a shaft 23, upon the respective ends of which shaft are mounted sprockets 25, 26. Similarly journalled in the rear pair of upper bearings is a shaft 27 upon which are mounted a pair of similar sprockets 28, 29 spaced apart in alinement respectively with sprockets 25, 26. The shaft 27 is driven from a suitable source of power not shown.

Carried and driven by the sprockets is an endless conveyor 31, which comprises a pair of endless chains 33, 34 and a plurality of containers 35, each container normally being adapted to receive and retain an object such as an egg with portions thereof projecting, and further adapted to be opened for removal or discharge of the object therefrom. The containers are mounted and coupled to the chains in the manner hereinafter described to form a unitary conveyor assembly. The chains 33, 34 provide the support for the conveyor and the means by which drive is transmitted thereto. The chain 33 couples the drive sprocket 28 to the forward sprocket 25, and the chain 34 similarly couples the rear sprocket 29 and the forward sprocket 26. The containers 35 are disposed between the chains 33, 34 and are arranged in parallel rows transverse the machine, each row containing a plurality of containers, in the present instance being illustrated as four. It will be understood that this number may be varied if desired without departing herefrom. The containers of each row are transversely equally spaced apart so that the containers are respectively longitudinally alined, the number of longitudinal lines of containers corresponding to the number of containers in each transvers row.

Each container 35 comprises a trailing section 35A and a leading section 35B, which are spaced apart to receive the object to be conveyed, such as eggs, and supplement each other to retain such object. Each container section is indented to form a hollow 35C, which is preferably shaped to conform to the shape of a portion of the surface of the object to be handled. The hollows 35C of each container 35 are opposed so as to jointly serve to engage opposite portions of the surface of the object to be handled and to thus more satisfactorily retain the object as it is conveyed. In the present illustration, the container hollows 35C are shown as of curved cross section, and are particularly shaped to handle ovoid objects such as eggs. It will be understood that the shape of the hollows 35C may be modified to suit particular cases without departing herefrom.

Where, as in the present instance, it is desired to employ the conveyor in the handling of fragile objects such as eggs, it is preferable to line each of the hollows with a resilient cushion 35D, preferably of sponge rubber.

Each leading section 35B is provided with a pair of integral lugs 35E, which, when the container is in upright position, project therebelow. These lugs are adapted to effect opening of the container in the manner hereinafter described.

Figure 19:
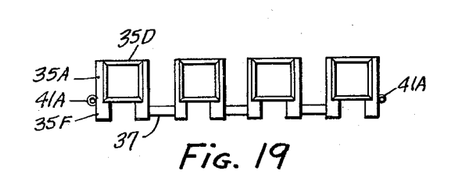
Fig. 19 is an elevational view of a transverse group of container trailing sections.
Figure 20:
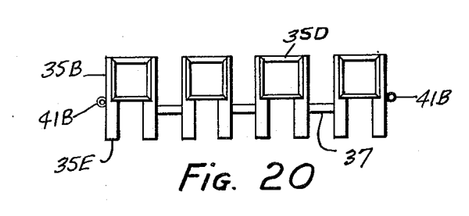
Fig. 20 is an elevational view of a transverse group of container leading sections.
Figure 21:
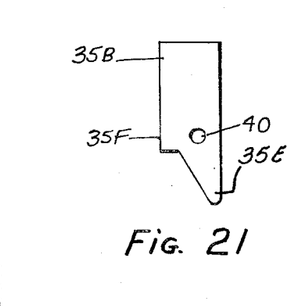
Fig. 21 is an end view of the group of Fig. 20.

The trailing sections and the leading sections of each transverse row of containers are respectively assembled, as shown in Figs. 19 and 20, into rigidly connected transversely alined unitary groups which are secured to the chains 33, 34. In each group the container sections are rigidly coupled by alined intermediate stub rods 37, each rod 37 being rigidly secured at one end to one section and at its other end to an adjacent section, the respective points of securing being adjacent but below the lower edges of hollows 35C.

For the purpose of securing the container section groups thus formed to the chains 33, 34, pins 39 are rigidly secured to the chains 33, 34 and project inwardly therefrom. The pins 39 are arranged along the chains in longitudinally spaced pairs, the pins of each pair being spaced apart the distance desired for the spacing of the trailing section groups from the leading section groups. The trailing section groups are positioned so that the alined intermediate stub rods 37 are brought into alinement with the inwardly projecting pins 39 and are rigidly secured as by welding to the pins 39 with the trailing sections groups perpendicular to the plane of the chains and projecting upwardly therefrom.

The leading section groups are preferably provided with an aperture 40 in the respective end portions of the group, this aperture being alined with the intermediate stub rods 37 of the leading section group. The apertures are adapted to turnably fit the pins 39, and in the mounting of the leading section groups the pins 39 are inserted in the apertures and preferably secured thereagainst removal as by suitable cotter pins or by peening so that the group may be turned about its longitudinal axis which is disposed transverse to the machine and along which the rods 37 and pins 39 are alined, with the pins 39 acting as pivots.

The leading sections are normally free to turn and move away from or toward the trailing sections and are retained in position approximately parallel to the trailing groups by tension springs 41 which are respectively positioned at the opposite ends of the associated groups. One end of each of the tension springs is secured, as at 41A, to an end of a trailing section group and the opposite end is secured, as at 41B, to the corresponding end of a leading section group. The points of securing are preferably adjacent, but above, the point of securing the pins 39 to the respective sections. The tension springs are preferably formed so that they are out of tension when the respective container section groups are parallel and come under tension upon turning movement of the leading section groups away from the trailing section groups, so that the springs are adapted to urge the return of the leading section groups to their normal position, parallel with the trailing section groups.

It will be noted that the main or body portion of the container section is of a length slightly less than the length of the object to be handled thereby so that a portion of the object will project above the containers, and another portion of the object projects below the body of the containers. Each of the container sections is downwardly extended on its opposite sides with legs 35F, the legs 35F of the trailing sections being provided to receive the stub rods 37 to enable the coupling of the sections while leaving the space between the legs open for easy access to the portion of the object handled by such container which projects below the container. The legs 35F of the leading sections similarly are spaced apart and receive the intermediate rods 37, and further provide the base from which the lugs 35E are extended.

It will thus be seen that the conveyor 31 is formed of the chains 33, 34 and the containers 35, which containers are arranged in transversely alined rows, the rows being longitudinally spaced apart and the containers of each row are adapted to be simultaneously opened by the turning movement of the leading sections about their pivots 39 away from the trailing sections.

Rearward of the forward sprockets 25, 26, there is mounted upon the upper members 11 a cabinet 43 which is provided to house the means for cleaning and drying the objects passed therethrough by the conveyor. The cabinet extends transverse the machine from upper member to upper member and includes side walls 44 which are seated on and extend along the upper members 11. The cabinet is preferably provided with a front wall 45 having a transverse opening 45A therethrough to permit the entry of the containers 35 thereinto, and the cabinet is further provided with a rear wall 47 having a similar transverse opening 47A to permit the exit of the containers from the cabinet. The front, rear, and side walls extend upwardly from the upper members 11 beyond the conveyor 31 and the cabinet is completed by a roof 49. Internally the cabinet is preferably provided with transverse baffles 51, 52 subdividing the cabinet into the chambers 43A, 43B, 43C, the baffles 51, 52 being respectively provided with transverse openings 51A, 52A, similar to the openings in the front and rear wall to provide for the passage of the containers therethrough.

Housed within the forward chamber 43A are spray nozzles 53 connected by the pipe 54 to a suitable source of washing fluid, not shown. Also mounted in the forward chamber 43A below the spray nozzles 53 are a pair of elongated rotary brushes 55 driven in suitable manner from a source of power, not shown, which are adapted to scrubbingly contact the projected upper portions of objects carried by the containers passing therebelow.

Housed within the intermediate chamber 43B is a second group of spray nozzles 57 communicated by a suitable pipe 58 with a source of rinse water, not shown, these second nozzles being adapted to spray rinse water upon the objects passed therebeneath by the conveyor to rinse therefrom the washing fluid and remains of the scrubbing. For the purpose of drying the washed and rinsed objects, the rearward chamber 43C is provided with air nozzles 59 communicated by a suitable pipe 60 to a source of drying air, not shown, air being passed therethrough under pressure to provide a drying blast removing the moisture from the objects and containers passed therebelow.

Rearward of the cabinet 43 and adjacent but forward of the rear sprockets 28, 29, a pair of supports 61, 62 are seated upon the upper members 11 and rigidly secured thereto as by welding or bolting. These supports are arranged in off-set relation so that the support 61 mounted on one of the upper members 11 is slightly rearward of the support 62 mounted upon the other of the upper members 11. These supports 61, 62 are preferably formed of angle iron although other suitable structural shapes may be employed, and they are adapted primarily to provide support for an endless band saw 63 carried by pulleys 65, 66. The pulley 65 is mounted on and keyed to a suitable shaft 67, one end of which is journalledly supported by the support 61. On the opposite end of the shaft 67 is mounted a pulley 69 coupled by a suitable belt 71 to a motor 73 mounted upon one of the upper members 11. The pulley 66 is carried by a second shaft 75 which is journalledly supported at one end by the upright 62. The shafts 67, 75 are positioned parallel to each other and the pulleys 65, 66 are arranged in diametric alinement, this alinement by virtue of the offset positioning of the uprights 61, 62 being diagonally across the machine. The band saw 63 which surrounds the pulleys and is driven thereby, spans the machine in the same diagonal alinement at an angle of approximately twenty degrees from the line of travel of the conveyor belt. The band saw is disposed with its cutting or toothed edge 63A facing toward the direction from which the conveyor moves and is disposed with its lower flight adjacent but just above the upper level of the containers 35 of the conveyor, so as to cuttingly contact portions of objects carried by the containers projecting thereabove as these objects are moving beneath the saw.

Below the level of the conveyor chains 33, 34 a strap 77 having rearwardly turned flanges 77A spans between the uprights 61, 62 and is secured at its opposite ends to these uprights through the rearwardly turned flanges. Carried by the strap 77 are a plurality of resilient members 79, these members being each preferably provided with an upturned flange 79A, the flanges 79A being rigidly secured to the rearward face of the strap 77 so as to rigidly secure the resilient members 79 to the strap 77 at one end, the opposite end of the resilient members being free. The resilient members are preferably formed of leaf spring material and one such member is provided for each longitudinal row of containers in the conveyor. The resilient members are disposed in alinement with the longitudinal rows of containers with the free ends of the members positioned to extend above the level of the bottom of the hollows 35C of the containers. The resilient members are adapted to extend between the legs 35F of the container sections and to yieldingly contact the objects carried by the containers, such as eggs, and to urge these objects upwardly within the respective containers.

Above the level of the containers a depressor plate 81 is rigidly secured at its opposite ends to the uprights 61, 62 and spans therebetween parallel to the band saw 63. The rearward edge 81A of the depressor plate is disposed to overlie the upper surface of the lower flight of the band saw and preferably terminates rearward of the cutting teeth 63A of the saw. The forward edge 81B of the depressor plate is positioned slightly higher than the rearward edge so as to dispose the plate slanting downwardly toward the lower flight of the band saw. In this manner means are provided to insure a uniform depth of cut of each object passed into the operating plane of the band saw as all objects carried by the conveyor are passed between the fixed depressor plate and the resilient members. Thus it will be seen that the resilient members will urge all of the objects upwardly against the depressor plate by which they will be uniformly alined and delivered to the band saw for cutting.

Rearwardly of the saw the conveyor passes over the rearward sprockets 28, 29 moving the containers from upright position to inverted position. In the handling of eggs it has been found that where the upper portion of the shell is removed frequently the inner membrane of the egg is not pierced or broken so that the contents are held within the shell thereby. In order to insure that the egg membrane will furnish no interference to the discharge of the liquid egg content from the egg shells capped by the saw 63, means for piercing the egg membranes are provided. In the present instance, these means comprise a drum 83 carried by a shaft 85, disposed transversely of the machine and being journalled in suitable bearings 87 mounted on the rear legs 17 below the level of the upper members 11. The drum 83 extends transversely between the rear legs 17, the opposite ends of the drum being spaced a minor distance inwardly from the legs, and is provided with a plurality of sets of radial spikes 89, there preferably being provided four such spikes spaced equidistant about the drum for each set of spikes, and one such set of spikes being provided for each longitudinal line of containers 35. The shaft 85 is coupled by a pulley 90 and belt 91 to a pulley 92 carried by a main shaft 27 and is driven thereby. Through relative size of the pulleys 90, 92, the rotation of the shaft 85 is synchronized with the rotation of the shaft 27 so that a spike 89 is moved into alinement with the opened end of the egg carried by the container 35 just below the level of the upper members 11. The length of the spikes is such that when the position of alinement is reached the point of the spike projects slightly into the opening in the shell and is adapted to contact and effect rupture of the membrane. It will be seen that as the spike is moved arcuately rearward, the container and the egg carried thereby is removed arcuately forward so that the arcuate paths of the two objects diverge and permit the spike to clear the edge of the shell without contacting it.

It has further been found that in the majority of instances the mere removal of a portion of egg shell and the breaking of the inner membrane does not insure gravity discharge of the liquid content from the shell even when inverted because of the vacuum action of the shell which tends to retain the contents within the shell so long as the main body of the shell is intact. In the present machine, in order to insure the successful discharge by gravity of the liquid content, means are provided for perforating the unbroken end of the shell to break the vacuum and permit the liquid contents to flow from the shell. For this purpose a plurality of drills 93 are provided, these drills being preferably rotary and independently driven by low powered motors such as fractional horse power electric motors 95. The drills are preferably alined transverse the machine below the level of upper members 11 and are mounted for reciprocating movement synchronized with the movement of the conveyor, the movement being timed so that, as each transverse row of conveyors is moved beneath the drills, the points of the drills are moved downwardly into boring or perforating contact with the unbroken ends of the now inverted eggs, and as the conveyor moves the containers forwardly away from the drills the drills are moved upwardly out of the path of the eggs. This reciprocating movement is accomplished by the mounting of the drills, a bar 97 being rigidly secured preferably to the upper portion of the motor casings, so that the motors and drills are suspended therebelow.

Rigidly secured and extending rearwardly from the bar 97 is a rocker arm 99 which is provided with an apertured central portion 99A, the aperture of this portion being adapted to turnably fit a rod 101 extending transversely and spanning between the upper members 11 and being fixedly secured at its opposite ends to the respective upper members. The rocker arm is preferably restrained from transverse movement along the rod 101 by collars 103 which are preferably held in place as by set screws. Rearwardly from the apertured portion 99A the rocker arm is extended and terminates in an upturned portion 99B which is preferably provided with a roller 99C. The roller is positioned to contact a composite cam 105 which is mounted on the main shaft 27 and is turned therewith.

Figure 1:
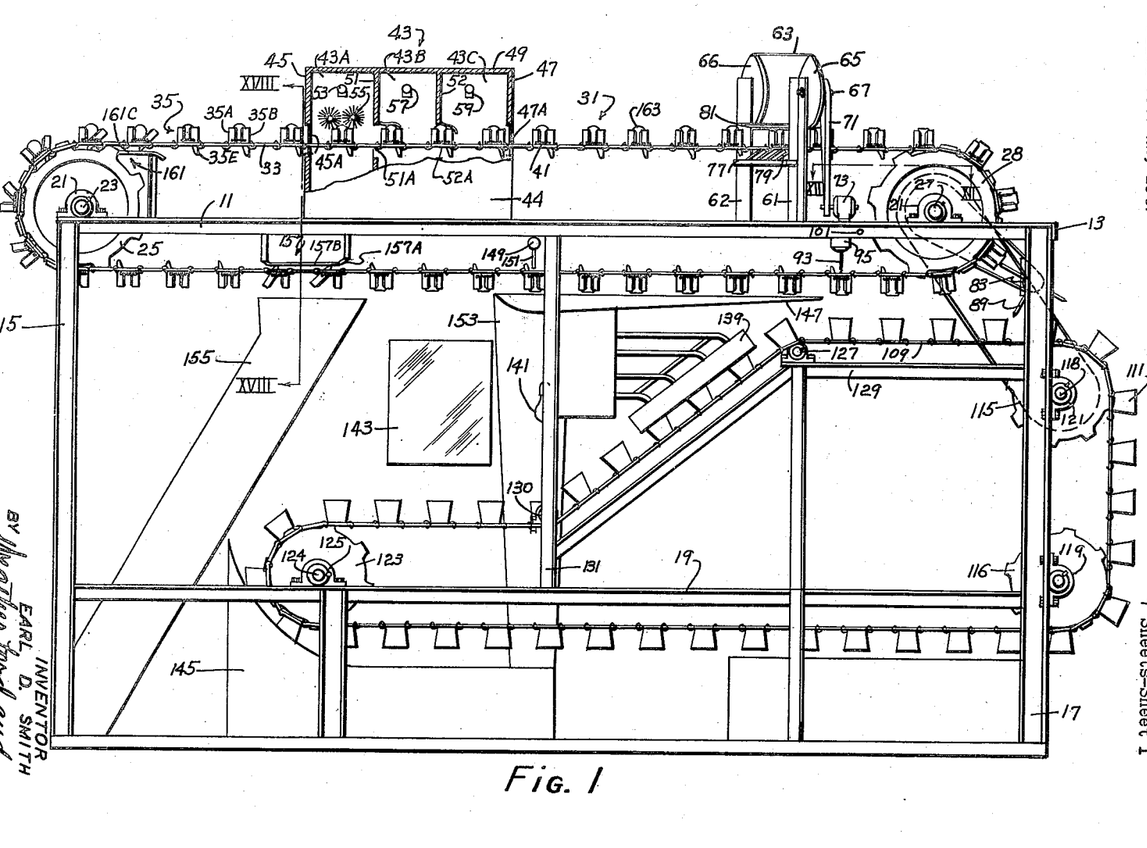
Fig. 1 is a side elevational view of the machine of this invention.
Figure 2:
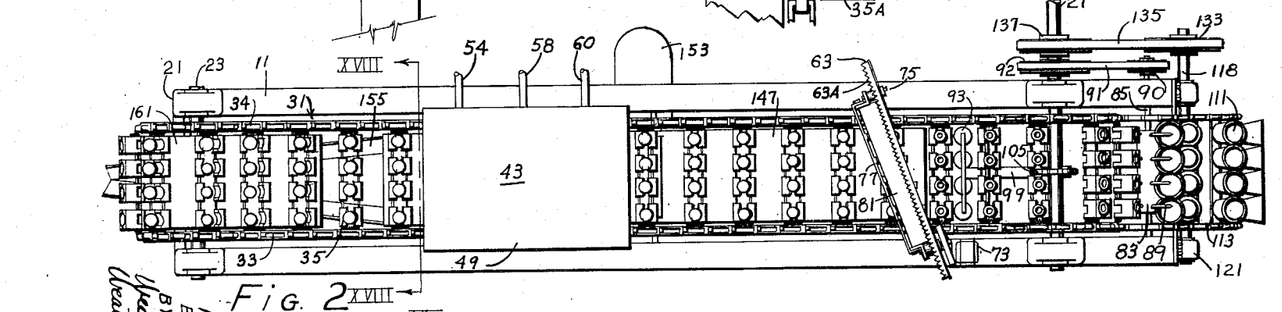
Fig. 2 is a top or plan view of the machine.
Figure 3:
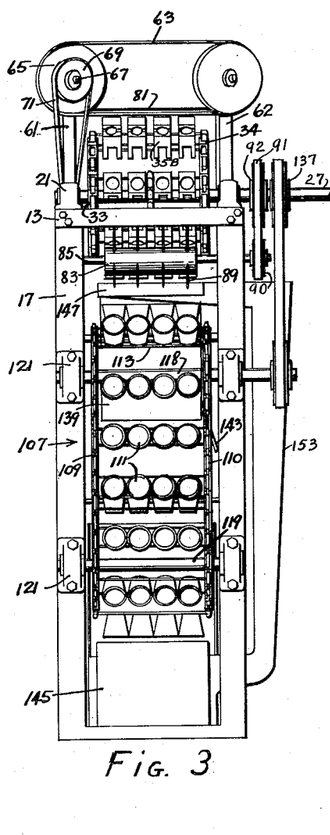
Fig. 3 is an end elevation of the machine.
Figure 4:
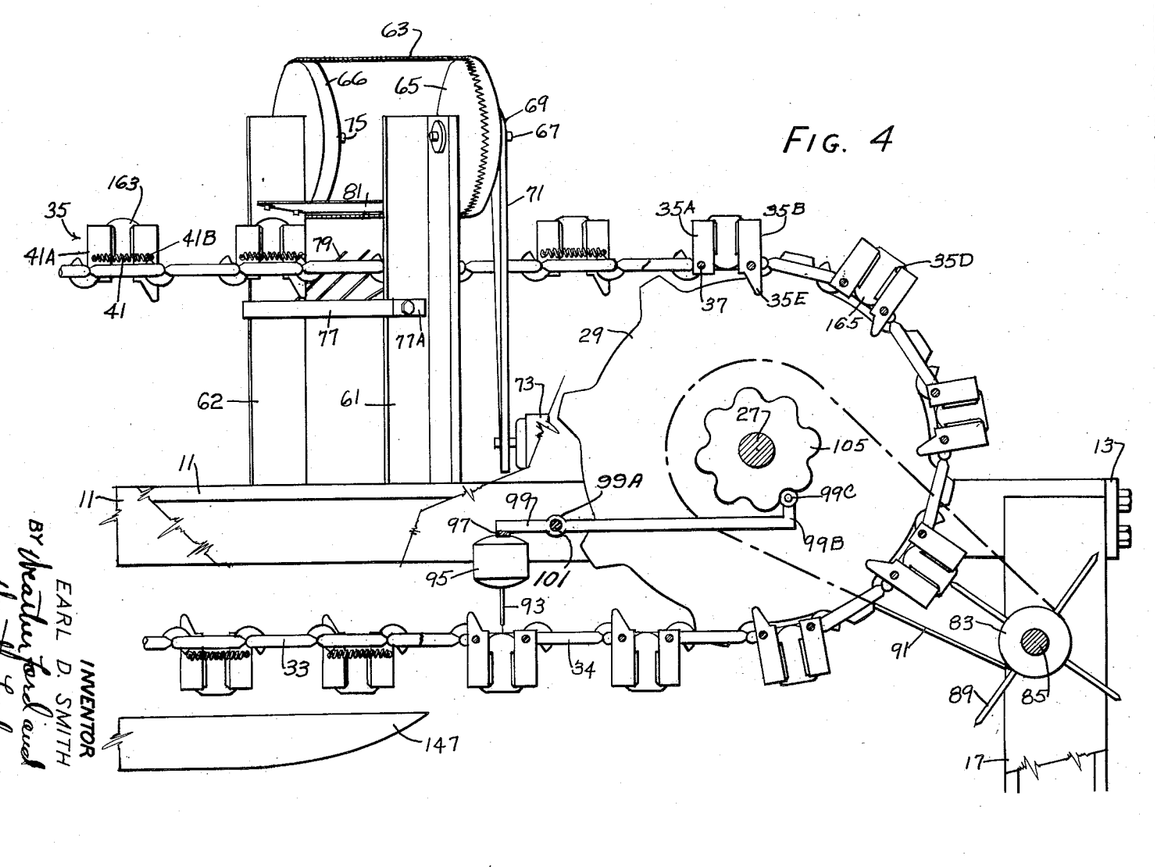
Fig. 4 is a fragmental side view on an enlarged scale, partly in section and partly in elevation, of the rear end of the conveyor belt of the present invention, together with associated parts.
Figures 5, 13, 14, 15, 16, 17:
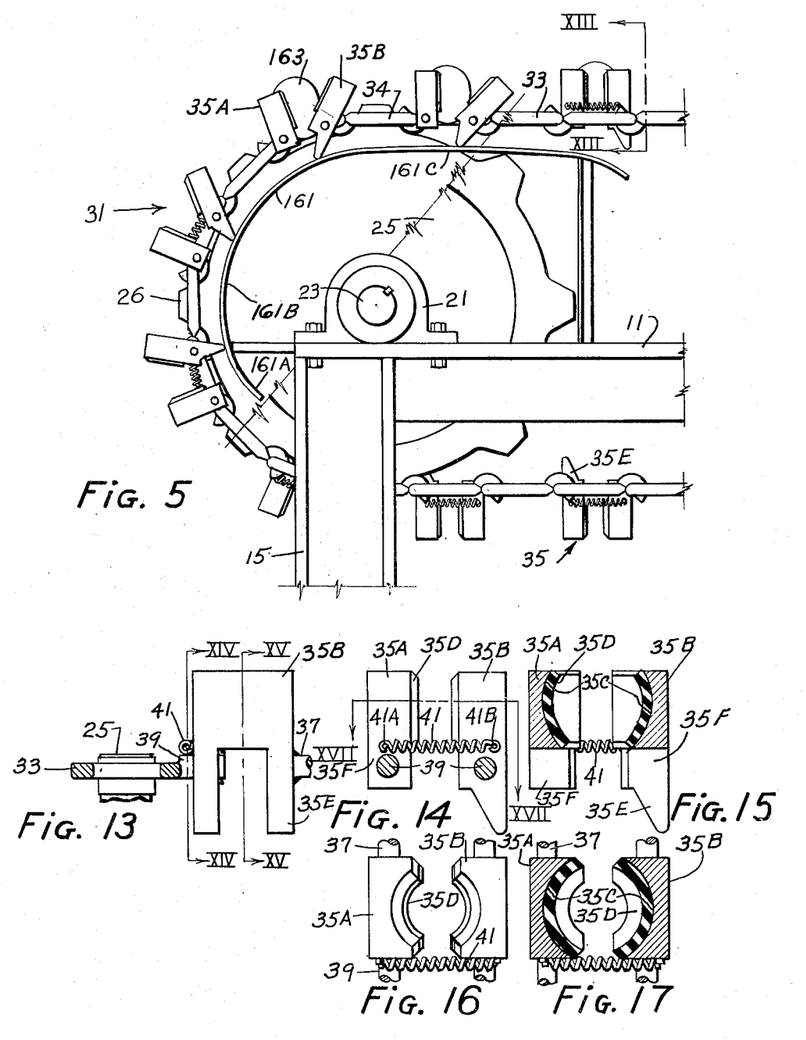
Fig. 5 is a view similar to Fig. 4 of the forward end of the conveyor belt and associated parts.
Fig. 13 is a fragmentary sectional view of the line XIII—XIII of Fig. 5 illustrating one of the egg containers of the conveyor of this invention.
Fig. 14 is a sectional view on the line XIV—XIV of Fig. 13.
Fig. 15 is a sectional view on the line XV—XV of Fig. 13.
Fig. 16 is a top plan view of an individual container.
Fig. 17 is a fragmentary sectional plan view on the line XVII—XVII of Fig. 14.
Figure 6:
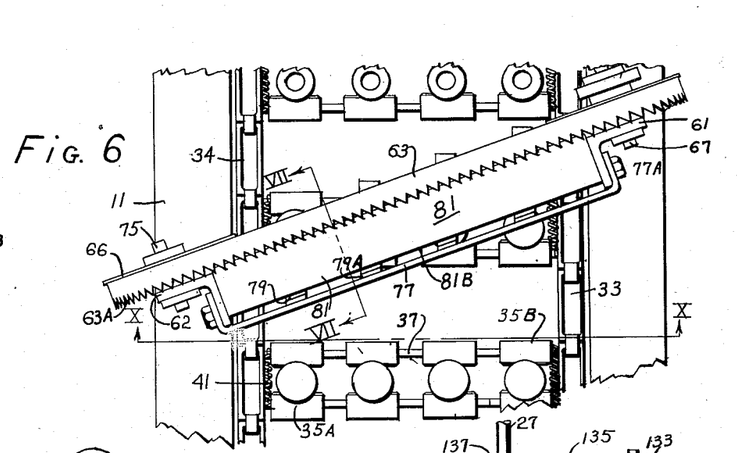
Fig. 6 is a fragmentary plan view on an enlarged scale illustrating a portion of the upper part of the conveyor belt and the arrangement of the egg capping saw means in relation thereto.
Figure 7:
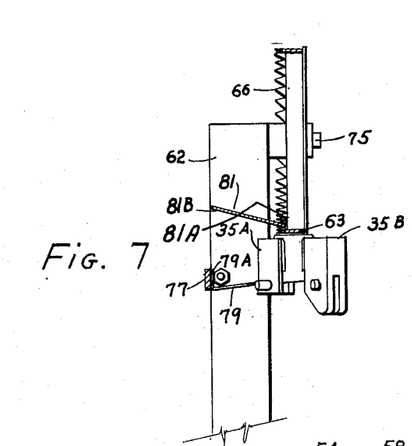
Fig. 7 is a fragmentary sectional view taken on the line VII—VII of Fig. 6.
Figure 8:
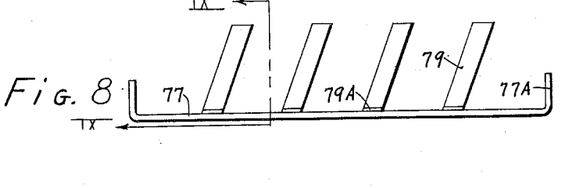
Fig. 8 is a detailed view of the resilient egg raising means of the invention.
Figure 9:
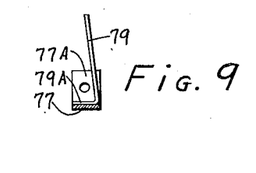
Fig. 9 is a sectional view taken on the line IX—IX of Fig. 8.
Figure 10:
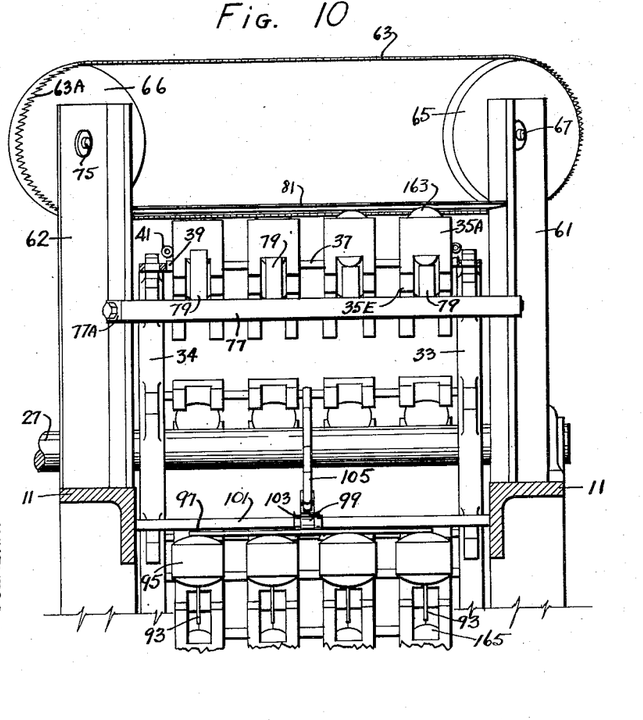
Fig. 10 is a sectional view taken on the line X—X of Fig. 6.
Figure 11:
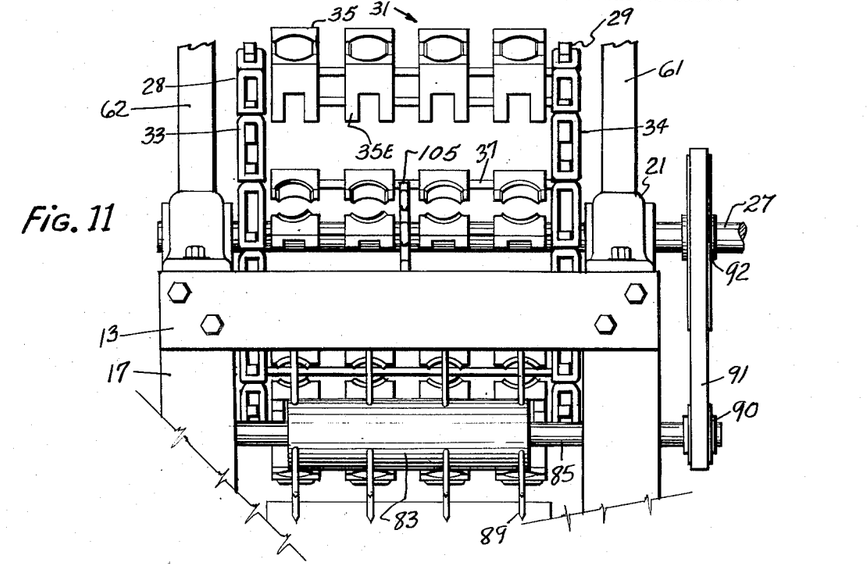
Fig. 11 is a fragmentary rear end elevation of the upper portion of the machine.
Figure 12:
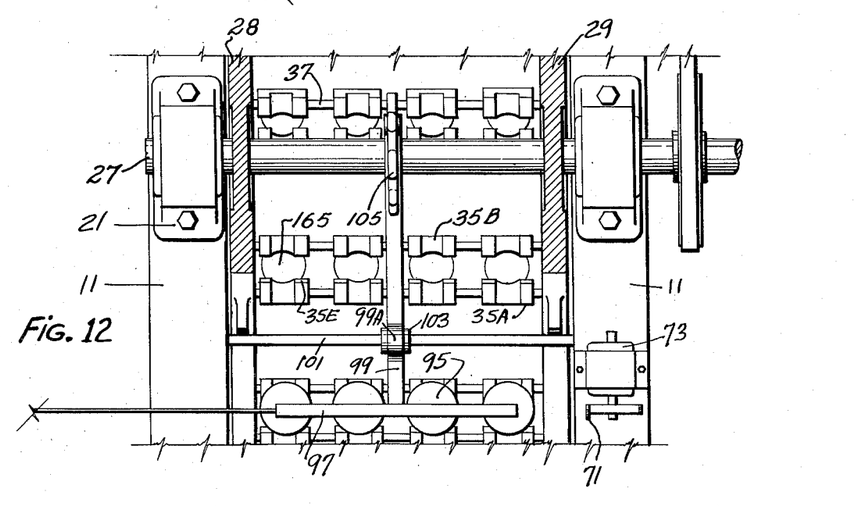
Fig. 12 is a fragmentary sectional plan view, on a scale similar to the scale of Fig. 11, taken on the line XII—XII of Fig. 1.
Figure 18:
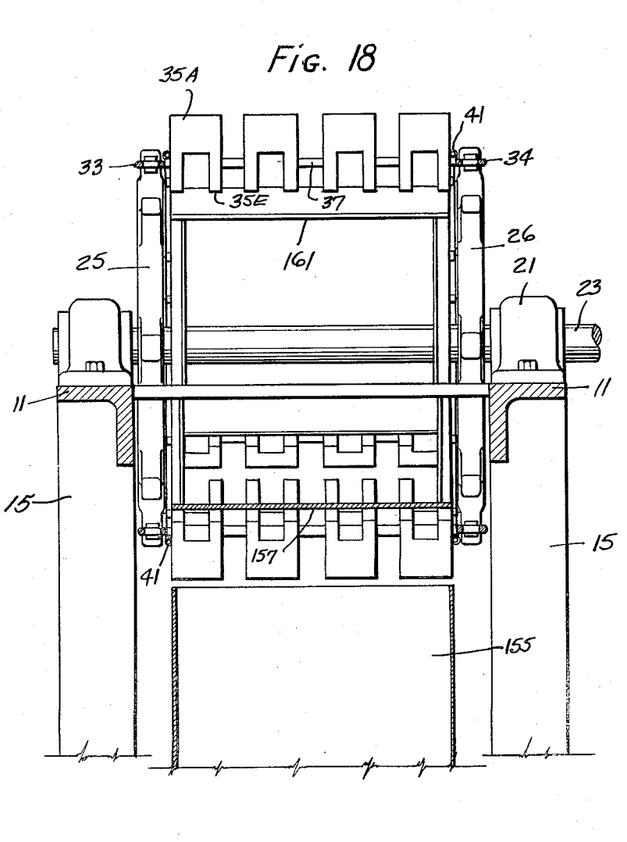
Fig. 18 is a fragmentary sectional elevation on an enlarged scale taken on the line XVIII—XVIII of Fig. 1.

It is believed that it will be obvious that as the shaft is rotated the terminal portion of the rocker arm will be alternately moved downwardly and released by the undulating surface of the cam wheel 105 and that as the terminal portion is moved downwardly the drills, secured to the opposite end of the rocker arm, will be raised and that the weight of the drills and motors depending from the bar 97 will be sufficient to move the drills downwardly as the downward pressure on the terminal end 99B of the rocker arm is released. As shown, particularly in Fig. 4, the cam 105 is positioned on the shaft so that the drills are lowered by gravity as a row of containers is moved therebeneath so as to effect boring contact with the unbroken portion of the egg shells, and are moved upwardly as the containers are moved away, then against being lowered when the next succeeding row of containers is moved therebeneath.

When the unbroken portion of the egg shells have been pierced by the drills the liquid content is no longer restrained by the shell and is free to discharge freely through the capped end. In order to receive the liquid content thus released and to convey it to a processing bin, there has been provided a lower conveyor 107, comprising a pair of longitudinal chains 109, 110 and a plurality of cups 111. The cups 111 are longitudinally spaced apart a distance equal to the longitudinal spacing between the transverse rows of the containers 35 and are preferably arranged in transverse rows corresponding to the container transverse rows. Each transverse row of cups 111 is preferably mounted on and carried by a pair of transverse rods 113 which are preferably removably secured to the chains 109, 110 so that the cups may be removed from the lower conveyor for purposes of cleaning and the like.

The rear end of the lower conveyor 107 is supported through the chains 109, 110 by vertically spaced rear sprockets 115, 116, which are respectively mounted on transverse shafts 118, 119, these shafts being journalled in suitable bearings 121 mounted on the rear legs 17. The forward end is supported by sprockets 123 mounted on a transverse shaft 124 journalled in suitable bearings 125 which are mounted on intermediate longitudinal members 19. The upper flight of the lower conveyor is passed over suitable idlers 127 which are mounted on intermediate frame members 129. Forwardly of the idlers 127 the chains are passed beneath lower idlers 130 which are suitably mounted on a shaft carried by an upright frame member 131. These idlers are provided to move the lower conveyor from the upper level of its upper flight adjacent the lower flight of the upper conveyor 31 downwardly along an incline to a lower level, the incline being provided that the change in level may be accomplished without spillage of the liquid-egg content contained in the cups. The lower conveyor is coupled to the main drive and is driven synchronized with the movement of the upper conveyor. The drive coupling is preferably accomplished through a pulley 133 mounted on the shaft 118, this pulley being coupled by a suitable belt 135 to a pulley 137 mounted on the main shaft 27.

When the liquid content of the egg shells have been released by the boring of the shells above described and have discharged into the cups 111, the liquid egg material is moved forwardly by the lower conveyor down the incline as described and preferably passes beneath a conventional odor detecting device 139 which is suitably electrically connected to the main drive to effect interruption of the drive in the event the odor of a spoiled egg is detected. After leaving the odor detecting device the liquid containing cups are preferably passed beneath an examining light 141, at which place visual inspection for discoloration or other signs of deterioration may be made, this inspection preferably being assisted by a mirror 143 positioned to enable an operator to readily view the cup contents. The cups are thence moved forwardly and the chains passing around the forward lower sprockets 123, the cups 111 are inverted and discharge their contents by gravity into a suitable receptacle 145 in which the liquid egg content may be processed, or from which it may be removed for processing elsewhere.

After the egg shells have been bored by the drills 93 and the liquid content released for discharge into the cups as described, the upper conveyor 31 moves forwardly, the emptied shells passing over a trough 147 which extends transversely of the machine and is adapted to receive the drip of any residual liquid material not discharged into the cups 111. The trough extends forwardly, preferably beyond the intermediate upright 131 and is sloped downwardly to provide for flow of the residual drip material toward the forward end of the trough 147.

Adjacent the forward end of the trough 147 a pneumatic device 149 which is connected to a suitable source of air pressure, preferably the source of drying air communicated with the air nozzles 59, but which source is not shown. The pneumatic device is provided with nozzles 151 by which jets of air are directed downwardly, a nozzle being provided for each longitudinal line of containers. As the containers pass therebeneath the openings bored into the egg shells by the drills 93 pass beneath the air jets and the air entering therein serves to force from the egg shells any remaining residue of the liquid content which has not been discharged therefrom by gravity, such pressure discharged residue being received in the trough 147.

The residual liquid egg material received in the trough 147 moves by gravity down the slope of the trough to the forward end and discharges downwardly through a chute 153 which opens into the trough adjacent its forward end. The chute 153 is communicated with the receptacle so that all of the egg material is collected into a common receptacle.

After the egg shells have been passed beneath the air blast from the nozzles 151 the conveyor moves forwardly to discharge the emptied shells into a waste chute 155. The discharge of the emptied shells is accomplished by the successive opening of the transverse rows of the containers as they are moved over the hopper-like mouth of the chute 155. For the purpose of opening the containers a cam plate 157 suspended from the upper frame members 11 and extending transversely of the machine is provided, this cam plate being adapted to cooperate with the lugs 35E of the leading sections of the containers to effect rotation of the leading sections 35B about their pins 39 against the action of the springs 41 and away from the trailing sections 35A. It will be seen that the cam plate 157 is formed so that its rear edge 157A is upturned and is spaced above the plane in which the lugs 35E are moved and curves downwardly to provide a gradual approach to a substantially level horizontally disposed camming portion 157B positioned in adjacency to the containers 35 so that the lugs slide thereagainst and therealong, effecting the opening of the containers as described.

When the containers are moved forwardly beyond the cam plate 157 the pressure on the lugs is released and the springs 41 are enabled to return the container leading sections 35B to normal position parallel to the trailing sections 35A. In order to facilitate loading of the containers at the forward end of the machine, it is desirable to provide for opening the containers as they pass around the forward end of the machine so as to provide for the easy insertion of objects thereinto. For this purpose a second cam plate 161 is provided, this cam 161 being provided at its lower end with an inwardly turned portion 161A, similar to the upwardly turned portion 157A, which portion 161A is spaced inwardly from the plane in which the lugs 35E are moved. The portion 161A provides a gradual approach to the camming surface which is positioned to be slidingly contacted by the lugs 35E and effect opening of the containers against the action of the springs 41 in the manner just described. The camming surface includes an arcuate section 161B which is concentric with the sprockets 25, 26 and a tangential section 161C which is parallel with the upper flight of the conveyor 31 and which terminates slightly rearwardly of the forward sprockets 25, 26. The cam 161 is supported in suitable fashion from the upper members 11 and is a plate-like member spanning the machine so as to be successively slidingly contacted by the lugs 35E of the transverse container rows.

In the operation of the device for the processing of eggs, the eggs are inserted in the containers opened as they pass around the forward end of the machine. As the egg filled containers are moved rearwardly and leave the cam 161, the springs 41 move the leading sections into holding contact with the eggs, with caps 163 projecting above the containers and end portions 165 projecting below the bottoms of the containers and between the legs 35F. They are passed successively through the cabinet 43, beneath the spray nozzles 53 and brushes 55, the rinse spray nozzles 57 and the drying nozzles 59, in which cabinet the caps 163 are washed and dried. The eggs are thence moved rearwardly and are passed between the rearwardly sloping depressor plate 81 which contacts the caps 163 and the resilient members 79 which contacts the end portions 165, so that the eggs, regardless of size, are alined with caps of uniform height projecting thereabove. As the eggs are moved toward the rearward edge of the depressor plate they are successively moved into contact with the cutting edge of the band saw 63, by which the upper portion or caps of the egg shells are removed. The capped eggs are moved thence rearwardly and as the containers 35 are inverted in passing around the rear ends of the machine the membranes are pierced by the spikes 89. The inversion of the containers is then completed and the unbroken end portions 165 of the shells are perforated by the drills 93. The contents are then discharged by gravity into the lower conveyor cups 111, in manner described.

It will thus be seen that in the present machine the eggs are moved quickly through the entire process so that the lapse of a minimum period takes place between the time the eggs are rotated at the forward end of the machine and the liquid content is discharged into the bin 145.

It will further be seen that in order to provide for the longitudinal movement of the eggs the present machine includes a novel conveyor which is adapted to retain objects through various processing steps and to discharge the objects when the processing thereof has been completed.

I claim:

1. An egg handling machine which consists of the combination of a supporting frame; drive means associated with said frame; an endless conveyor having upper and lower runs mounted on said frame coupled to said drive means and including a plurality of containers arranged in londitudinally spaced transverse rows, having open tops and bottoms and adapted to receive eggs inserted therein, said containers yieldingly clamping said inserted eggs during handling thereof with caps and end portions of said eggs projecting respectively above said open tops and below said open bottoms; said containers being upright along said upper run and inverted along said lower run; a depressor plate rigidly mounted on and diagonally spanning said frame and spaced above the level of said container tops, the forward edge of said plate being above the level of the rearward edge thereof, said edges being respectively parallel to said container tops; a plurality of resilient members underlying said depressor plate, each attached at its forward end to said frame below the level of said container bottoms, the rearward ends of said members being free and diverging upwardly from said attached ends substantially to the level of said container bottoms; saw means supported from and diagonally spanning said frame in alinement with said plate with the cutting edge of said saw means facing forwardly, said cutting edge lying between the level of and parallel to said container tops and said rearward plate edge and forwardly of said rearward plate edge and the said free ends of said resilient members; said conveyor moving said containers and the eggs therein between said depressor plate and said resilient members toward said cutting edge, said resilient members contacting the projecting end portions of said eggs and urging said eggs upwardly against said depressor plate to project said caps of said eggs uniformly beyond said container tops, said conveyor moving said uniformly projected caps against said cutting edge for opening of said eggs by removal of said caps from said eggs; membrane piercing means mounted on said frame rearwardly of said saw means, comprising a drum journalledly supported transverse said frame and spaced from the open ends of said eggs, and a plurality of spikes radiating from said drum, said spikes being of length to span the space between said drum and said opened ends and to extend a minor distance into said opened ends, said drum being coupled to said drive means for rotation synchronized with the movements of said conveyor to successively position said spikes to extend into the opened ends of each succeeding transverse row of containers; drill means mounted along the path of said lower run to boringly pierce the end portions of the eggs in said inverted containers, and release the liquid content of said eggs from the shells thereof; means for reciprocating said drill means into and out of boring contact with said end portions; means for reeciving the liquid-egg content discharged; and means for successively opening said transverse container rows for gravity discharge of the emptied shells therefrom.

2. An egg handling machine which consists of the combination of a supporting frame; drive means associated with said frame; an endless conveyor having upper and lower runs mounted on said frame coupled to said drive means and including a plurality of containers arranged in longitudinally spaced transverse rows, having open tops and bottoms and adapted to receive eggs inserted therein, said containers yieldingly clamping said inserted eggs during handling thereof with caps and end portions of said eggs projecting respectively above said open tops and below said open bottoms; said containers being upright along said upper run and inverted along said lower run; a depressor plate rigidly mounted on and diagonally spanning said frame and spaced above the level of said container tops; a plurality of resilient members underlying said depressor plate, each attached at its forward end to said frame below the level of said container bottoms, the rearward ends of said members being free and diverging upwardly from said attached ends substantially to the level of said container bottoms; saw means supported from said frame in alinement with said plate with the cutting edge of said saw means facing forwardly, said cutting edge lying between the level of and parallel to said container tops and said rearward plate edge; said conveyor moving said containers and the eggs therein between said depressor plate and said resilient members toward said cutting edge, said resilient members contacting the projecting end portions of said eggs and urging said eggs upwardly against said depressor plate to project said caps of said eggs uniformly beyond said container tops, said conveyor moving said uniformly projected caps against said cutting edge for opening of said eggs by removal of said caps from said eggs; membrane piercing means mounted on said frame rearwardly of said saw means, and adapted to extend a minor distance into said opened ends, means for successively positioning said piercing means to extend into the opened ends of each succeeding transverse row of containers; means for inverting said containers; drill means mounted along the path of said lower run to boringly pierce the end portions of the eggs in said inverted containers, and release the liquid content of said eggs from the shells thereof; means for reciprocating said drill means into and out of boring contact with said end portions; means for receiving the liquid-egg content discharged; and means for successively opening said transverse container rows for gravity discharge of the emptied shells therefrom.

3. An egg handling machine which consists of the combination of a supporting frame; drive means associated with said frame; an endless conveyor having upper and lower runs mounted on said frame coupled to said drive means and including a plurality of containers arranged in longitudinally spaced transverse rows, having open tops and bottoms and adapted to receive eggs inserted therein, said containers yieldingly clamping said inserted eggs during handling thereof with caps and end portions of said eggs projecting respectively above said open tops and below said open bottoms; said containers being upright along said upper run and inverted along said lower run; a depressor plate rigidly mounted on said frame and spaced above the level of said container tops, the forward edge of said plate being above the level of the rearward edge thereof, said edges being respectively parallel to said container tops; a plurality of resilient members underlying said depressor plate, each attached at its forward end to said frame below the level of said container bottoms, the rearward ends of said members being free and diverging upwardly from said attached ends substantially to the level of said container bottoms; saw means supported from and spanning said frame in alinement with said plate with the cutting edge of said saw means facing forwardly, said cutting edge lying between the level of and parallel to said container tops and said rearward plate edge; said conveyor moving said containers and the eggs therein between said depressor plate and said resilient members toward said cutting edge, said resilient members contacting the projecting end portions of said eggs and urging said eggs upwardly against said depressor plate to project said caps of said eggs uniformly beyond said container tops, said conveyor moving said uniformly projected caps against said cutting edge for opening of said eggs by removal of said caps from said eggs; membrane piercing means mounted on said frame rearwardly of said saw means, and adapted to extend a minor distance into said opened ends; means for successively positioning said piercing means to extend into the opened ends of each succeeding transverse row of containers; drill means mounted along the path of said lower run to boringly pierce the end portions of the eggs in said inverted containers, and release the liquid content of said eggs from the shells thereof; means for reciprocating said drill means into and out of boring contact with said end portions; means for receiving the liquid-egg content discharged; and means for successively opening said transverse container rows for gravity discharge of the emptied shells therefrom.

4. An egg handling machine which consists of the combination of a supporting frame; drive means associated with said frame; an endless conveyor having upper and lower runs mounted on said frame coupled to said drive means and including a plurality of containers arranged in longitudinally spaced transverse rows, having open tops and bottoms and adapted to receive eggs inserted therein, said containers yieldingly clamping said eggs during handling thereof with caps and end portions of said eggs projecting respectively above said open tops and below said open bottoms; said containers being upright along said upper run and inverted along said lower run; a depressor plate rigidly mounted on said frame spaced above the level of said container tops, a plurality of resilient members underlying said depressor plate, each attached at its forward end to said frame below the level of said container bottoms, the rearward ends of said members being free and diverging upwardly from said attached ends substantially to the level of said container bottoms; saw means supported from said frame in alinement with said plate with the cutting edge of said saw means facing forwardly, said cutting edge lying between the level of and parallel to said container tops and said rearward plate edge; said conveyor moving said containers and the eggs therein between said depressor plate and said resilient members toward said cutting edge, said resilient members contacting the projecting end portions of said eggs and urging said eggs upwardly against said depressor plate to project said caps of said eggs uniformly beyond said container tops, said conveyor moving said uniformly projected caps against said cutting edge for opening of said eggs by removal of said caps from said eggs; membrane piercing means mounted on said frame rearwardly of said saw means, and adapted to extend a minor distance into said opened ends; means for successively positioning said piercing means to extend into the opened ends of each succeeding transverse row of containers; drill means mounted along the path of said lower run to boringly pierce the end portions of the eggs in said inverted containers, and release the liquid content of said eggs from the shells thereof; means for reciprocating said drill means into and out of boring contact with said end portions; means for receiving the liquid-egg content discharged; and means for successively opening said transverse container rows for gravity discharge of the emptied shells therefrom.

5. An egg handling machine which consists of the combination of a supporting frame; drive means associated with said frame; an endless conveyor having upper and lower runs mounted on said frame coupled to said drive means and including a plurality of containers arranged in longitudinally spaced transverse rows, each of said containers consisting of a pair of opposing sections spaced longitudinally apart, one of said sections being rigidly connected to said conveyor and the opposite said section being pivotally connected to said conveyor and resiliently coupled to said rigidly connected section, said resilient connection urging said pivoted section into egg holding relation with said rigidly connected section; said containers having open tops and bottoms and adapted to receive eggs inserted therein, said containers yieldingly clamping said inserted eggs during handling thereof with caps and end portions of said eggs projecting respectively above said open tops and below said open bottoms; said containers being upright along said upper run and inverted along said lower run; a depressor plate rigidly mounted on said frame and spaced above the level of said container tops, a plurality of resilient members underlying said depressor plate, each attached at its forward end to said frame below the level of said container bottoms, the rearward ends of said members being free and diverging upwardly from said attached ends substantially to the level of said container bottoms; saw means supported from said frame in alinement with said plate with the cutting edge of said saw means facing forwardly, said cutting edge lying between the level of and parallel to said container tops and said rearward plate edge; said conveyor moving said containers and the eggs therein between said depressor plate and said resilient members toward said cutting edge, said resilient members contacting the projecting end portions of said eggs and urging said eggs upwardly against said depressor plate to project said caps of said eggs uniformly beyond said container tops, said conveyor moving said uniformly projected caps against said cutting edge for opening of said eggs by removal of said caps from said eggs; membrane piercing means mounted on said frame rearwardly of said saw means, and adapted to extend a minor distance into said opened ends and disrupt the egg membrane therein; means for successively positioning said piercing means to extend into the opened ends of each succeeding transverse row of containers.

6. An egg handling machine which consists of the combination of a supporting frame, drive means associated therewith; an endless conveyor having upper and lower runs mounted on said frame coupled to said drive means and including a plurality of containers arranged in longitudinally spaced transverse rows, each of said containers consisting of a pair of opposing sections spaced longitudinally apart, one of said sections being rigidly connected to said conveyor and the opposite said section being pivotally connected to said conveyor and resiliently coupled to said rigidly connected section, said resilient connection urging said pivoted section into egg holding relation with said rigidly connected section; said containers having open top and bottoms and adapted to receive eggs inserted therein, said containers yieldingly clamping said inserted eggs during handling thereof with caps and end portions of said eggs projecting respectively above said open tops and below said open bottoms; said containers being upright along said upper run and inverted along said lower run; saw means supported from said frame with the cutting edge of said saw means facing forwardly, said cutting edge lying above the level of and parallel to said container tops; said conveyor moving said containers and the eggs therein toward said cutting edge, said conveyor moving said caps against said cutting edge for opening of said eggs by removal of said caps from said eggs; membrane piercing means mounted on said frame rearwardly of said saw means, and adapted to extend a minor distance into said opened ends; means for successively positioning said piercing means to extend into the opened ends of each succeeding transverse row of containers; means for receiving the discharge of liquid-egg content; and means for successively opening said transverse container rows for gravity discharge of the emptied shells therefrom.

7. An egg handling machine which consists of the combination of a supporting frame; drive means associated with said frame; an endless conveyor having upper and lower runs mounted on said frame coupled to said drive means and including a plurality of containers arranged in longitudinally spaced transverse rows, having open tops and bottoms and adapted to receive eggs inserted therein, said containers yieldingly clamping said inserted eggs during handling thereof with caps and end portions of said eggs projecting respectively above said open tops and below said open bottoms; said containers being upright along said upper run and inverted along said lower run; saw means supported from said frame with the cutting edge of said saw means facing forwardly, said cutting edge lying above the level of and parallel to said container tops in the plane of said projecting caps; said conveyor moving said containers and the eggs therein toward said cutting edge, to move said projected caps against said cutting edge for opening of said eggs by removal of said caps from said eggs; membrane piercing means mounted on said frame rearwardly of said saw means, and adapted to extend a minor distance into said opened ends, means for successively positioning said piercing means to extend into the opened ends of each succeeding transverse row of containers; drill means mounted along the path of said lower run to boringly pierce the end portions of the eggs in said inverted containers, and release the liquid content of said eggs from the shells thereof; means for reciprocating said drill means into and out of boring contact with said end portions; means for receiving the liquid-egg content discharged; and means for successively opening said transverse container rows for gravity discharge of the emptied shells therefrom.

8. An egg handling machine which consists of the combination of a supporting frame; drive means associated with said frame; an endless conveyor having upper and lower runs mounted on said frame coupled to said drive means and including a plurality of containers arranged in longitudinally spaced transverse rows, having open tops and bottoms and adapted to receive eggs inserted therein, said containers yieldingly clamping said inserted eggs during handling thereof with caps and end portions of said eggs projecting respectively above said open tops and below said open bottoms; said containers being upright along said upper run and inverted along said lower run; a depressor plate rigidly mounted on said frame and spaced above the level of said container tops, a plurality of resilient members underlying said depressor plate, each attached at its forward end to said frame below the level of said container bottoms, the rearward ends of said members being free and diverging upwardly from said attached ends substantially to the level of said container bottoms; saw means supported from said frame in alinement with said plate with the cutting edge of said saw means facing forwardly, said cutting edge lying between the level of and parallel to said container tops and said rearward plate edge; said conveyor moving said containers and the eggs therein between said depressor plate and said resilient members toward said cutting edge, said resilient members contacting the projecting end portions of said eggs and urging said eggs upwardly against said depressor plate to project said caps of said eggs uniformly beyond said container tops, said conveyor moving said uniformly projected caps against said cutting edge for opening of said eggs by removal of said caps from said eggs; membrane piercing means mounted on said frame rearwardly of said saw means, comprising a drum journalledly supported transverse said frame and spaced from the open ends of said eggs, and a plurality of spikes radiating from said drum, said spikes being of length to span the space between said drum and said opened ends and to extend a minor distance into said opened ends, said drum being coupled to said drive means for rotation synchronized with the movements of said conveyor to successively position said spikes to extend into the opened ends of each succeeding transverse row of containers.

9. An egg handling machine which consists of the combination of a supporting frame; drive means associated with said frame; an endless conveyor having upper and lower runs mounted on said frame coupled to said drive means and including a plurality of containers arranged in longitudinally spaced transverse rows, each of said containers consisting of a pair of opposing sections spaced longitudinally apart, one of said sections being rigidly connected to said conveyor and resiliently coupled to said rigidly connected section, said resilient connection urging said pivoted section into egg holding relation with said rigidly connected section; said containers having open tops and bottoms and adapted to receive eggs inserted therein, said containers yieldingly clamping said inserted eggs during handling thereof with caps and end portions of said eggs projecting respectively above said open tops and below said open bottoms; said containers being upright along said upper run and inverted along said lower run; a depressor plate rigidly mounted on said frame and spaced above the level of said container tops, a plurality of resilient members underlying said depressor plate, each attached at its forward end to said frame below the level of said container bottoms, the rearward ends of said members being free and diverging upwardly from said attached ends substantially to the level of said container bottoms; saw means supported from said frame in alinement with said plate with the cutting edge of said saw means facing forwardly, said cutting edge lying between the level of and parallel to said container tops and said rearward plate edge; said conveyor moving said containers and the eggs therein between said depressor plate and said resilient members toward said cutting edge, said resilient members contacting the projecting end portions of said eggs and urging said eggs upwardly against said depressor plate to project said caps of said eggs uniformly beyond said container tops, said conveyor moving said uniformly projected caps against said cutting edge for opening of said eggs by removal of said caps from said eggs.

10. An egg handling machine which consists of the combination of a supporting frame; drive means associated with said frame, an endless conveyor having upper and lower runs mounted on said frame coupled to said drive means and including a plurality of containers arranged in longitudinally spaced transverse rows, having open tops and bottoms and adapted to receive eggs inserted therein, said containers yieldingly clamping said inserted eggs during handling thereof with caps and end portions of said eggs projecting respectively above said open tops and below said open bottoms; said containers being upright along said upper run and inverted along said lower run; a depressor plate rigidly mounted on said frame and spaced above the level of said container tops, a plurality of resilient members underlying said depressor plate, each attached at its forward end to said frame below the level of said container bottoms, the rearward ends of said members being free and diverging upwardly from said attached ends substantially to the level of said container bottoms; saw means supported from said frame in alinement with said plate with the cutting edge of said saw means facing forwardly, said cutting edge lying between the level of and parallel to said container tops and said rearward plate edge; said conveyor moving said containers and the eggs therein between said depressor plate and said resilient members toward said cutting edge, said resilient members contacting the projecting end portions of said eggs and urging said eggs upwardly against said depressor plate to project said caps of said eggs uniformly beyond said container tops, said conveyor moving said uniformly projected caps against said cutting edge for opening of said eggs by removal of said caps from said eggs; drill means mounted along the path of said lower run to boringly pierce the end portions of the eggs in said inverted containers, and release the liquid content of said eggs from the shells thereof; means for reciprocating said drill means into and out of boring contact with said end portions; means for receiving the liquid-egg content discharged; and means for successively opening said transverse container rows for gravity discharge of the emptied shells therefrom.

11. An egg handling machine which consists of the combination of a supporting frame; drive means associated with said frame, an endless conveyor having upper and lower runs mounted on said frame coupled to said drive means and including a plurality of containers arranged in longitudinally spaced transverse rows, having open tops and bottoms and adapted to receive eggs inserted therein, said containers yieldingly clamping said inserted eggs during handling thereof with caps and end portions of said eggs projecting respectively above said open tops and below said open bottoms; said containers being upright along said upper run and inverted along said lower run; saw means supported from said frame with the cutting edge of said saw means facing forwardly, said cutting edge lying above the level of and parallel to said container tops in the plane of said projecting caps; said conveyor moving said containers and the eggs therein toward said cutting edge, to move said projecting caps against said cutting edge for opening of said eggs by removal of said caps from said eggs; drill means mounted along the path of said lower run to boringly pierce the end portions of the eggs in said inverted containers and release the liquid content of said eggs from the shells thereof; means for reciprocating said drill means into and out of boring contact with said end portions; means for receiving the liquid-egg content discharged; and means for successively opening said transverse container rows for gravity discharge of the emptied shells therefrom.

12. An egg handling machine which consists of the combination of a supporting frame; drive means associated with said frame, an endless conveyor having upper and lower runs mounted on said frame coupled to said drive means and including a plurality of containers arranged in longitudinally spaced transverse rows, each of said containers consisting of a pair of opposing sections spaced longitudinally apart, one of said sections being rigidly connected to said conveyor and the opposite said section being pivotally connected to said conveyor and resiliently coupled to said rigidly connected section, said resilient connection urging said pivoted section into egg holding relation with said rigidly connected section; said containers having open tops and bottoms and adapted to receive eggs inserted therein, said containers yieldingly clamping said inserted eggs during handling thereof with caps and end portions of said eggs projecting respectively above said open tops and below said open bottoms; said containers being upright along said upper run and inverted along said lower run; a depressor plate rigidly mounted on said frame spaced above the level of said container tops, a plurality of resilient members underlying said depressor plate, each attached at its forward end to said frame below the level of said container bottoms, the rearward ends of said members being free and diverging upwardly from said attached ends substantially to the level of said container bottoms; saw means supported from said frame in alinement with said plate with the cutting edge of said saw means facing forwardly, said cutting edge lying between the level of and parallel to said container tops and said rearward plate edge; said conveyor moving said containers and the eggs therein between said depressor plate and said resilient members toward said cutting edge, said resilient members contacting the projecting end portions of said eggs and urging said eggs upwardly against said depressor plate to project said caps of said eggs uniformly beyond said container tops, said conveyor moving said uniformly projected caps against said cutting edge for opening of said eggs by removal of said caps from said eggs; means for receiving the liquid-egg content discharged; and means for successively opening said transverse container rows for gravity discharge of the emptied shells therefrom.

13. An egg handling machine which consists of the combination of a supporting frame; drive means associated with said frame, an endless conveyor having upper and lower runs mounted on said frame coupled to said drive means and including a plurality of containers arranged in longitudinally spaced transverse rows, having open tops and bottoms and adapted to receive eggs inserted therein, said containers yieldingly clamping said inserted eggs during handling thereof with caps and end portions of said eggs projecting respectively above said open tops and below said open bottoms; said containers being upright along said upper run and inverted along said lower run; a depressor plate rigidly mounted on said frame spaced above the level of said container tops, a plurality of resilient members underlying said depressor plate, each attached at its forward end to said frame below the level of said container bottoms, the rearward ends of said members being free and diverging upwardly from said attached ends substantially to the level of said container bottoms; saw means supported from said frame in alinement with said plate with the cutting edge of said saw means facing forwardly, said cutting edge lying between the level of and parallel to said container tops and said rearward plate edge; said conveyor moving said containers and the eggs therein between said depressor plate and said resilient members towards said cutting edge, said resilient members contacting the projecting end portions of said eggs and urging said eggs upwardly against said depressor plate to project said caps of said eggs uniformly beyond said container tops, said conveyor moving said uniformly projected caps against said cutting edge for opening of said eggs by removal of said caps from said eggs; drill means mounted along the path of said lower run to boringly pierce the end portions of said inverted eggs and release the liquid content of said eggs from the shells thereof; means for reciprocating said drill means into and out of boring contact with said end portions; means for receiving the liquid-egg content discharged; and means for successively opening said transverse container rows for gravity discharge of the emptied shells therefrom.

14. An egg handling machine which consists of the combination of conveyor means for receiving and moving a plurality of eggs, said conveyor including a plurality of containers, having open tops and bottoms, adapted to hold said eggs with caps projecting beyond said open tops and end portions projecting beyond said open bottoms; depressor means for contacting said caps and establishing uniform projection thereof; resilient means urging said eggs against said depressor means; saw means interposed between said depressor means and said resilient means in the path of said caps to remove said caps from said eggs; piercer means disposed beyond said saw means along the path of the capless eggs to enter the opened portion of said eggs and pierce the egg membranes therein; and drill means disposed along the path of said projecting end portions for piercing contact therewith.

15. An egg handling machine which consists of the combination of conveyor means for receiving and moving a plurality of eggs, said conveyor including a plurality of containers, having open tops and bottoms, adapted to hold said eggs with caps projecting beyond said open tops and end portions projecting beyond said open bottoms; depressor means for contacting said caps and establishing uniform projection thereof; resilient means urging said eggs against said depressor means; saw means interposed between said depressor means and said resilient means in the path of said caps to remove said caps from said eggs, said saw means spanning said conveyor; piercer means disposed beyond said saw means along the path of the capless eggs to enter the opened portion of said eggs and pierce the egg membranes therein; and drill means disposed along the path of said projecting end portions for piercing contact therewith.

16. An egg handling machine which consists of the combination of conveyor means for receiving and moving a plurality of eggs, said conveyor including a plurality of containers having open tops and bottoms adapted to hold said eggs with caps projecting beyond said open tops and end portions projecting beyond said open bottoms; depressor means for contacting said caps and establishing uniform projection thereof, comprising a plate rigidly supported diagonally transverse said conveyor above the level of said container tops with the forward edge of said plate above the level of the rearward edge thereof; resilient means urging said eggs against said depressor means; saw means interposed between said depressor means and said resilient means in the path of said caps to remove said caps from said eggs and alined with said depressor means; piercer means disposed beyond said saw means along the path of the capless eggs to enter the opened portion of said eggs and pierce the membranes therein; and drill means disposed along the path of said projecting end portions for piercing contact therewith.

17. An egg handling machine which consists of the combination of conveyor means for receiving and moving a plurality of eggs, said conveyor including a plurality of containers having open tops and bottoms adapted to hold said eggs with caps projecting beyond said open tops and end portions projecting beyond said open bottoms; depressor means for contacting said caps and establishing uniform projection thereof; resilient means urging said eggs against said depressor means, comprising a plurality of flexible members disposed below the level of said containers and underlying said depressor means, said members being rigidly supported at their forward ends and having their rearward ends free and diverging upwardly substantially to the level of said container bottoms; saw means interposed between said depressor means and said resilient means in the path of said caps to remove said caps from said eggs; piercer means disposed beyond said saw means along the path of the capless eggs to enter the opened portion of said eggs and pierce the membranes therein; and drill means disposed along the path of said projecting end portions for piercing contact therewith.

18. An egg handling machine which consists of the combination of conveyor means for receiving and moving a plurality of eggs, said conveyor including a plurality of containers having open tops and bottoms adapted to hold said eggs with caps projecting beyond said open tops and end portions projecting beyond said open bottoms; depressor means for contacting said caps and establishing uniform projection thereof; resilient means urging said eggs against said depressor means, saw means interposed between said depressor means and said resilient means in the path of said caps to remove said caps from said eggs; piercer means disposed beyond said saw means along the path of the capless eggs to enter the opened portion of said eggs and pierce the membranes therein; drill means disposed along the path of said projecting end portions for piercing contact therewith; and means for reciprocating said drill means respectively into and out of drilling contact with said end portions.

19. An egg handling machine which consists of the combination of conveyor means for receiving and moving a plurality of eggs, said conveyor including a plurality of containers having open tops and bottoms adapted to hold said eggs with caps projecting beyond said open tops and end portions projecting beyond said open bottoms; depressor means for contacting said caps and establishing uniform projection thereof; resilient means urging said eggs against said depressor means; saw means interposed between said depressor means and said resilient means in the path of said caps to remove said caps from said eggs; piercer means disposed beyond said saw means along the path of the capless eggs to pierce the membranes of said eggs, comprising a drum journalledly supported transverse said conveyor and spaced therefrom and a plurality of spikes radiating from said drum, said spikes being transversely alined and being of a length to span the space within said drum and said containers and to enter said opened shells; means for moving said spikes respectively into and out of shell entering relation to said eggs; and drill means disposed along the path of said projecting end portions for piercing contact therewith.

20. Egg opening means which consist of the combination of conveyor means for receiving and moving a plurality of eggs, said conveyor including a plurality of containers, having open tops and bottoms, adapted to hold said eggs with caps projecting beyond said open tops and end portions adjacent said open bottoms; means disposed in the path of said caps to remove said caps from said eggs; and rotary drill means disposed along the path of said end portions for perforating contact therewith.

21. Egg opening means which consist of the combination of conveyor means for receiving and moving a plurality of eggs; said conveyor including a plurality of containers, having open tops and bottoms, adapted to hold said eggs with caps projecting beyond said open tops and end portions adjacent said open bottoms; egg leveling means for contacting said eggs to establish a uniform projection of said caps above said open tops; saw means disposed in the path of said caps to remove said caps from said eggs; and rotary drill means disposed along the path of said end portions for perforating contact therewith.

22. Egg opening means which consist of the combination of conveyor means for receiving and moving a plurality of eggs; said conveyor including a plurality of containers, having open tops and bottoms, adapted to hold said eggs with caps projecting beyond said open tops and end portions adjacent said open bottoms; saw means disposed in the path of said caps to remove said caps from said eggs; piercer means disposed along the path of the capless sections of said eggs to enter thereinto and pierce the egg membranes therein; and drill means disposed along the path of said end portions for perforating contact therewith.

23. Egg opening means which consist of the combination of conveyor means for receiving and moving a plurality of eggs; said conveyor including a plurality of containers, having open tops and bottoms, adapted to hold said eggs with caps projecting beyond said open tops and end portions adjacent said open bottoms; egg levelling means for contacting said eggs to establish a uniform projection of said caps above said open tops; saw means disposed in the path of said caps to remove said caps from said eggs; piercer means disposed along the path of the capless sections of said eggs to enter thereinto and pierce the egg membranes therein; and drill means disposed along the path of said end portions for perforating contact therewith.

24. Egg opening means which consist of the combination of conveyor means for receiving and moving a plurality of eggs; said conveyor including a plurality of containers, having open tops and bottoms, adapted to hold said eggs with caps projecting beyond said open tops and end portions adjacent said open bottoms; depressor means disposed in the path of said caps for contact therewith and establishment of uniform projection thereof; saw means disposed in the path of said caps to remove said caps from said eggs; and rotary drill means disposed along the path of said end portions for perforating contact therewith.

25. Egg opening means which consist of the combination of conveyor means for receiving and moving a plurality of eggs; said conveyor including a plurality of containers, having open tops and bottoms, adapted to hold said eggs with caps projecting beyond said open tops and end portions adjacent said open bottoms; depressor means disposed in the path of said caps for contact therewith and establishment of uniform projection thereof; saw means disposed in the path of said caps to remove said caps from said eggs; piercer means disposed along the path of the capless sections of said eggs to enter thereinto and pierce the egg membranes therein; and drill means disposed along the path of said end portions for perforating contact therewith.

26. Egg opening means which consist of the combination of conveyor means for receiving and moving a plurality of eggs, said conveyor including a plurality of containers, having open tops and bottoms, adapted to hold said eggs with caps projecting beyond said open tops and end portions adjacent said open bottoms; saw means disposed in the path of said caps to remove said caps from said eggs; drill means disposed along the path of said end portions for perforating contact therewith; and blower means disposed along the path of said eggs beyond said drill means for injecting air through the perforation made by said drill means.

EARL D. SMITH.

REFERENCES CITED

The following references are of record in the file of this patent:

UNITED STATES PATENTS

| Number | Name | Date |
|---|---|---|
| 317,469 | Moses et al. | May 5, 1885 |
| 1,057,636 | Grauer | Apr. 1, 1913 |
| 1,139,292 | Jirotka | May 11, 1915 |
| 1,560,053 | Harkin | Nov. 3, 1925 |
| 1,776,784 | Cramer | Sept. 30, 1930 |
| 1,837,357 | Chapman | Dec. 22, 1931 |
| 2,090,963 | Reese | Aug. 24, 1937 |
| 2,443,188 | Hodson | June 15, 1948 |
| 2,445,490 | Meade | July 20, 1948 |

FOREIGN PATENTS

| Number | Country | Date |
|---|---|---|
| 1,799 | Australia | Apr. 27, 1931 |